(No Model.) 2 Sheets—Sheet 1.
B. F. BEE.
CRANBERRY PICKER.
No. 410,397. Patented Sept. 3, 1889.
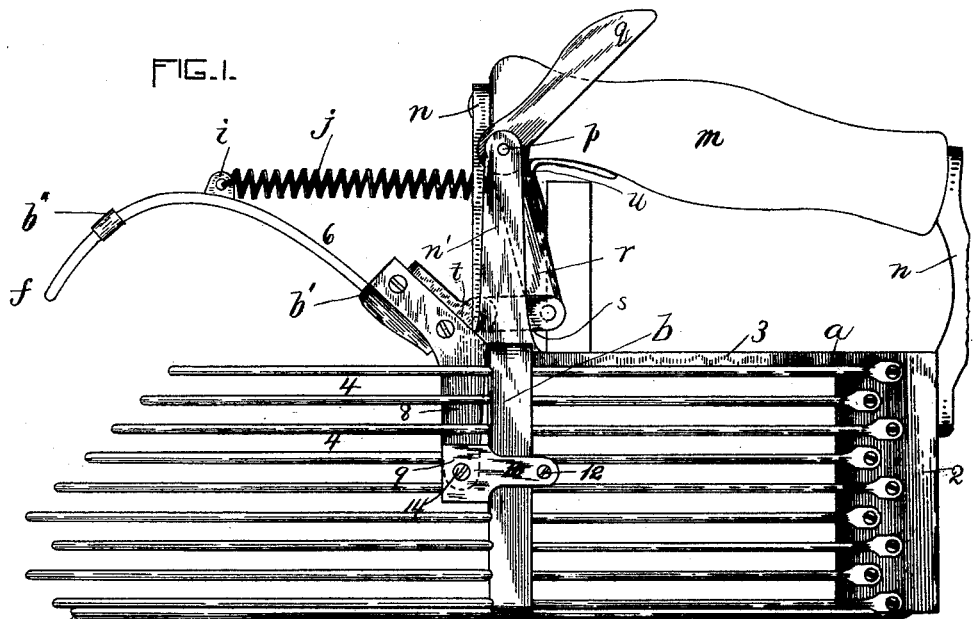
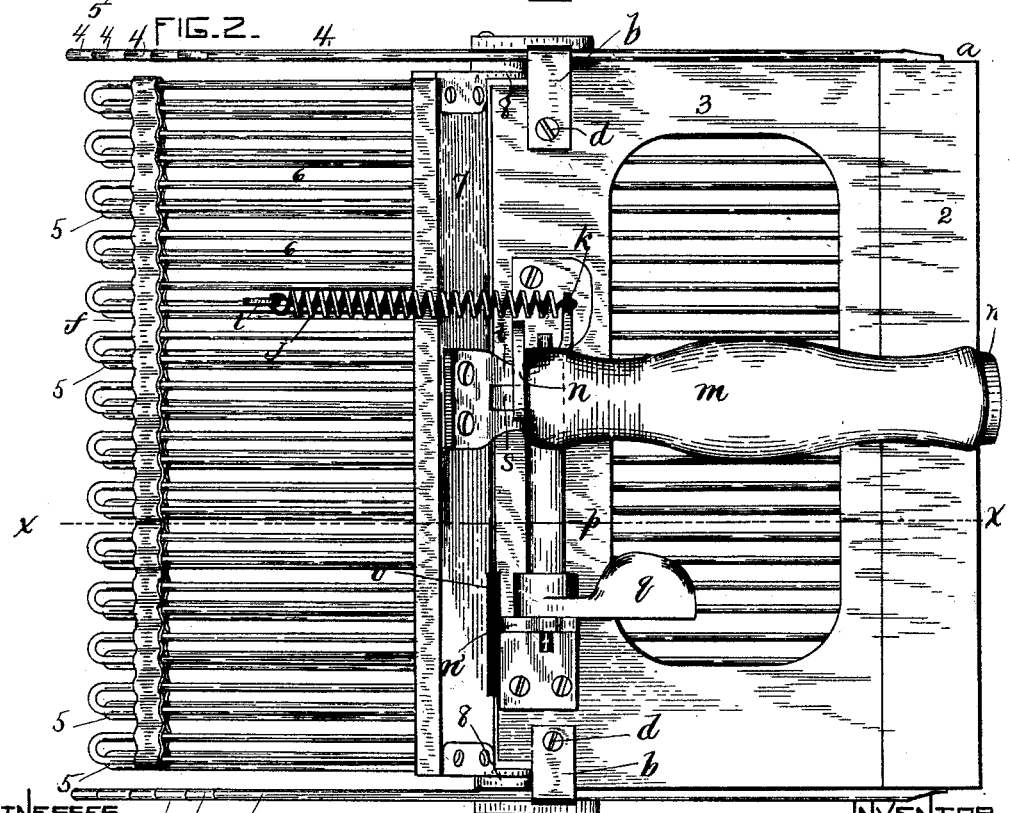
WITNESSES
N. C. Ramsay
H. E. Brown
INVENTOR
B. F. Bee
by Wright Brown Crosby
Attys

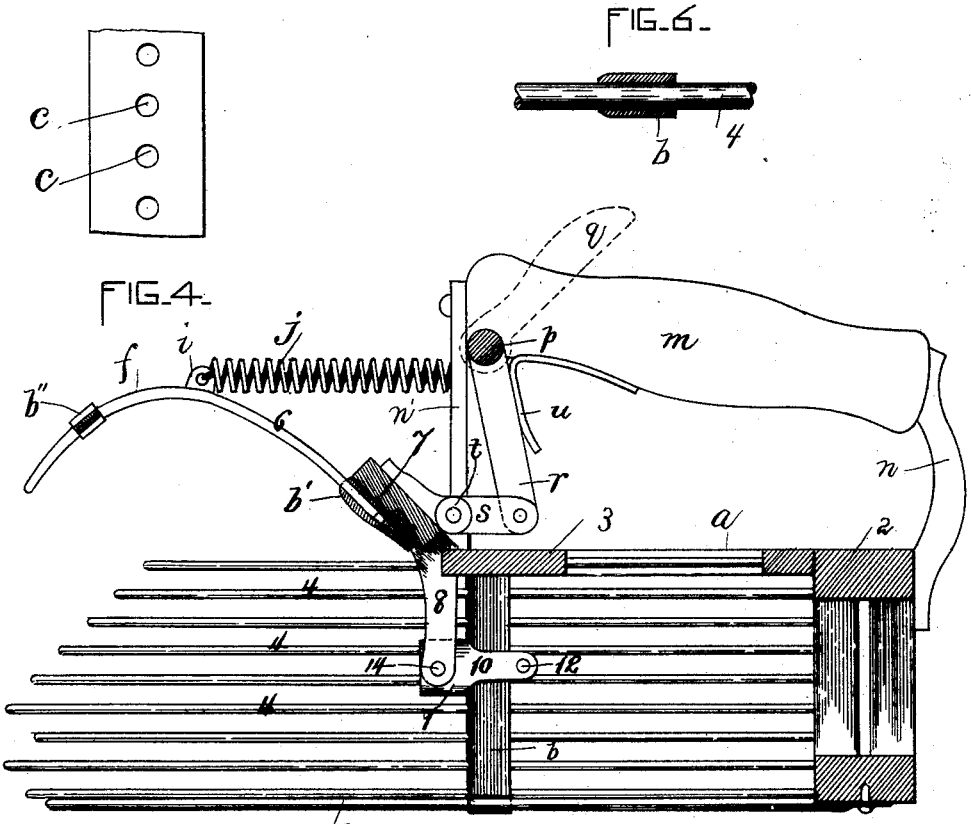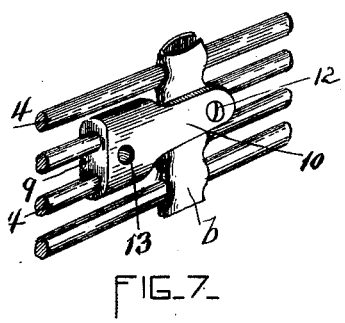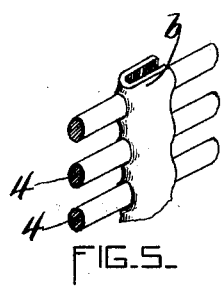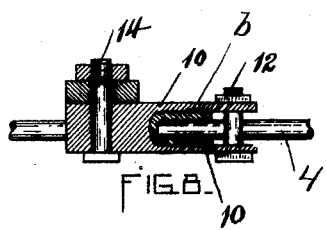

UNITED STATES PATENT OFFICE.

BENJAMIN F. BEE, OF HARWICH, MASSACHUSETTS, ASSIGNOR, BY DIRECT AND MESNE ASSIGNMENTS, TO EMULOUS SMALL, OF SAME PLACE, AND ABEL D. MAKEPEACE AND GEORGE F. BAKER, OF BARNSTABLE, MASSACHUSETTS.

CRANBERRY-PICKER.

SPECIFICATION forming part of Letters Patent No. 410,397, dated September 3, 1889.

Application filed May 31, 1889. Serial No. 312,704. (No model.)

*To all whom it may concern:*

Be it known that I, BENJAMIN F. BEE, of Harwich, in the county of Barnstable and State of Massachusetts, have invented certain new and useful Improvements in Cranberry-Pickers, of which the following is a specification.

This invention relates to hand-operated cranberry-pickers composed of a frame or receptacle the bottom and sides of which are made of parallel rods, and a rake or comb pivoted to said frame and adapted when depressed to co-operate with the bottom rods in stripping cranberries from vines held between said rods and a rake or comb, the frame or receptacle being provided with a suitable handle, and connected with the rake or comb by a spring which normally holds the comb in an elevated position.

My invention consists in certain improved devices whereby the operator may depress the rake or comb against the stress of its supporting-spring, and in various other improvements in the details of construction of a cranberry-picker of the class above specified, whereby the strength, durability, and efficiency of the apparatus are increased, all of which I will now proceed to describe and claim.

Of the accompanying drawings, forming a part of this specification, Figure 1 represents a side elevation of my improved cranberry-picker. Fig. 2 represents a top view of the same. Fig. 3 represents a section on line $x\,x$, Fig. 1. Figs. 4, 5, 6, 7, and 8 represent details hereinafter referred to.

The same letters of reference indicate the same parts in all of the figures.

In the drawings, $a$ represents the frame or receptacle, which is composed of a wooden back piece 2, a top piece 3, secured thereto, and parallel metal rods 4, forming the sides of the receptacle, and parallel metal rods 5, forming the bottom of the receptacle, said rods 4 5 being flattened at their rear ends, and there secured by screws, nails, or other fastening devices to the back piece 2, the rods extending horizontally forward from said back piece, and having their forward ends separated by intervening spaces, so that they can be readily thrust into cranberry-vines. The rods 4 5 are connected with each other and with the top piece of the frame or receptacle between their attached rear ends and their unattached forward ends by what I term a "metallic ligature" $b$. Said ligature is a strip of sheet metal perforated along its center with holes $c$, Fig. 4, of suitable size to receive the rods 4 5. The rods are passed through said holes, and the strip is bent into U shape, so that its sides bear against the rods, as shown in Figs. 5 and 6. This strip or ligature extends continuously across all the rods 4 5, and is attached at its ends to the top pieces 3 by screws or other fastening devices $d\,d$, Fig. 2. It will be seen that the ligature located between the attached and free ends of the rods constitute a light yet strong and sufficiently rigid intermediate support for said rods, preventing displacement of the same in any direction, each rod being firmly secured at two points—viz., at its rear end and at its point of engagement with the ligature. The rear portions of the rods between the ligature and the back piece 2 constitute practically rigid gratings, which, with the top piece and the back piece, compose the receptacle which receives the berries. I prefer to provide the top and back pieces with openings, which are guarded by parallel rods secured to said pieces and extending across the openings. Said openings and the open construction of the sides and bottom of the receptacle permit free escape of dust and other foreign matter in fragments smaller than berries.

$f$ represents the rake or comb, which is composed of wire teeth 6 and a cross-piece or rake-head 7, extending across the frame or receptacle and having downwardly-projecting metal ears 8 8, which extend into the frame or receptacle, and are pivoted within the latter to blocks or supports 9 9, which are detachably secured to the side rods 4. Said blocks or supports (shown in detail in Figs. 7 and 8) are provided with longitudinal holes to receive two of the side rods 4, and with ears 10 10, which project backwardly at opposite sides of the ligature $b$, their rear ends being connected by a bolt or screw 12, passing through orifices in the ears between the rods 4 4. The blocks 9 have orifices 13 to receive the pivot-bolts 14, that connect said blocks with the ears 8. By removing the bolts 12 the blocks 9 may be raised or lowered to vary the height of the pivots on which the rake or comb oscillates.

Each rake or comb tooth is preferably composed of a piece of wire bent to form a semicircular loop, which constitutes the outer end of the tooth, and two sides which are curved to give the desired longitudinal curvature to the tooth, the rear ends of said teeth being secured in any suitable way to the head 7. I prefer to secure said rear ends by inserting them in a ligature $b'$, constructed as above described, and attaching said ligature by screws or otherwise to the under side of the head 7. The teeth are connected and mutually supported at points near their outer ends by a ligature $b''$, constructed and applied to the teeth in the same manner that the ligature $b$ is constructed and applied to the rods 4 5. To one of the teeth 6 is soldered or otherwise secured an ear $i$, to which is attached one end of the spring $j$, which raises the rake or comb, the other end of said spring being attached to an ear $k$, suitably attached to the top piece 3 of the frame or receptacle $a$.

$m$ represents the handle, which is secured to brackets $n$ $n$, suitably attached to the frame or receptacle $a$, the spring-holding ear $k$ being formed on one of said brackets.

The devices which I employ for depressing the rake or comb are as follows: A rock-shaft $p$ is mounted to rotate backward and forward in bearings in brackets $n$ $n'$, attached to the top of the frame or receptacle, and is provided with a lever or thumb-piece $q$, standing in position to receive the downward pressure of the thumb of the hand which grasps the handle $m$. Said rock-shaft is also provided with a downwardly-projecting arm $r$, the lower end of which is connected by a link $s$ with an ear or ears $t$, attached to the head 7 of the rake or comb. The arrangement of said parts is such that when the rake or comb is raised by the spring $j$ the arm $r$ and the link $s$ are nearly at right angles with each other, as shown in full lines in Fig. 3. When the thumb-piece is depressed by the operator's thumb, the rock-shaft is partly rotated and the arm $r$ and link $s$ are thrown forward, the link and arm being at an obtuse angle or nearly in line with each other when the comb is depressed. It will be seen, therefore, that by this arrangement of the comb-depressing devices the force required to depress the comb decreases as the comb descends, the last part of the downward movement being easier than the first part. This is a feature of much importance, as the labor of depressing the comb is quite severe on the muscles of the thumb, and any means of lightening said labor will increase the usefulness of the machine. By the employment of the downwardly-projecting lugs 8 on the rake head or comb the pivots 14, on which said head or comb oscillates, are so depressed that the comb is more easily thrown down against the pressure of the spring $j$, said lugs 8 acting as levers co-operating with the lever $r$ and link $s$.

$u$ represents a sheet-metal guard-plate, which is attached to the under side of the handle and forms a smooth support or rest for the forefinger of the operator's hand, preventing friction on said finger by contact with any of the parts of the apparatus.

$v$ represents a rubber buffer attached to the top piece 3 and arranged to arrest the upward movement of the rake or comb by contact with the head 7 thereof.

I claim—

1. In a cranberry-picker of the class described, the frame or receptacle composed of the back piece, the side and bottom rods attached at their rear ends to said back piece and free or unattached at their forward ends, and the transverse ligature engaged with said rods at a point intermediate of their attached and free ends, as set forth.

2. In a cranberry-picker, the combination, with a series of wire rods or teeth and a rigid piece to which the rear ends of said rods or teeth are attached, of a transverse ligature connecting said rods or teeth at a point intermediate of their attached and free ends, as set forth.

3. The combination of the back piece 2, the top piece 3, the parallel side and bottom rods attached to said back piece, and the continuous ligature engaged with all of said rods and attached at its ends to the top piece, as set forth.

4. The combination, with the parallel rods, of the ligature composed of the sheet-metal strip perforated to receive said rods and bent to embrace the sides of said rods, as set forth.

5. The combination, with the frame or receptacle having the side rods 4 and bottom rods 5, of the rake or comb composed of the teeth 6 and head 7, the downwardly-projecting lugs 8 8, attached to the ends of the head and projecting downwardly into the space inclosed by the rods 4 5, and the blocks 9 9, secured to the side rods 4 and connected by pivots 14 with the lugs 8, as set forth.

6. The combination of the frame or receptacle having the side rods and the connecting-ligature, the blocks 9, perforated to receive one or more of said rods, means for engaging said blocks with the rods and ligature, and the rake or comb head having downwardly-projecting lugs pivoted to said blocks, as set forth.

7. The combination of the frame or receptacle having the handle $m$, the rock-shaft $p$, journaled in ears or brackets attached to said receptacle, and provided with a thumb-lever *q*, arranged in suitable proximity to said handle, the rake or comb pivoted to said frame, the downwardly-projecting arm *r*, affixed to the rock-shaft, and the link *s*, connecting the lower end of said arm with the comb-head.

In testimony whereof I have signed my name to this specification, in the presence of two subscribing witnesses, this 10th day of May, A. D. 1889.

BENJAMIN F. BEE.

Witnesses:
C. F. BROWN,
A. D. HARRISON.